Dec. 7, 1965   H. J. G. SCHADE   3,221,887
MACHINES FOR FILTERING LARGE QUANTITIES OF
WATER AND OTHER LIQUIDS
Filed Aug. 14, 1961   3 Sheets-Sheet 1

Inventor:
HARALD J. G. SCHADE
BY [signature] ATTY.

Dec. 7, 1965   H. J. G. SCHADE   3,221,887
MACHINES FOR FILTERING LARGE QUANTITIES OF
WATER AND OTHER LIQUIDS
Filed Aug. 14, 1961   3 Sheets-Sheet 2

Inventor:
HARALD J. G. SCHADE
BY  [signature]  ATTY.

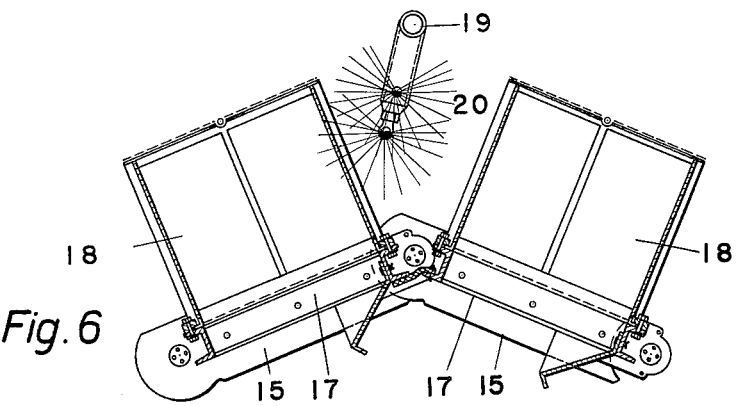
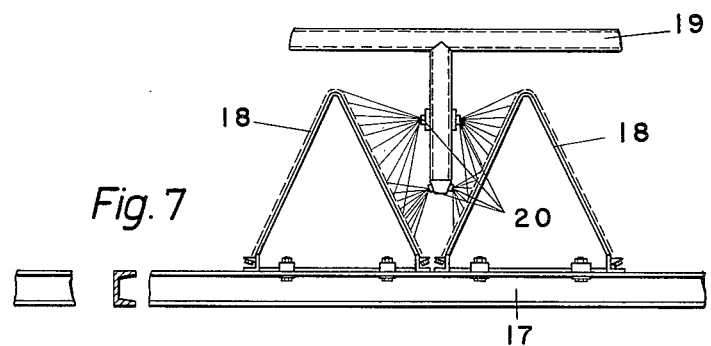
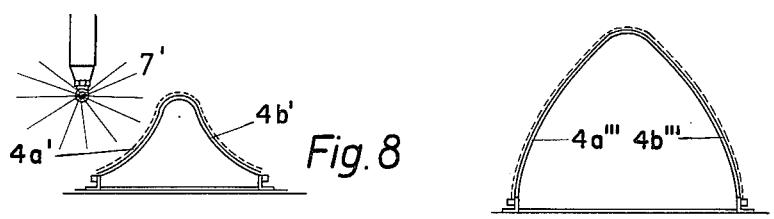
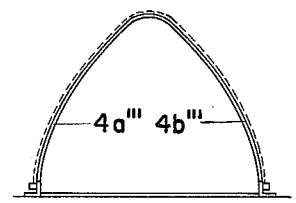
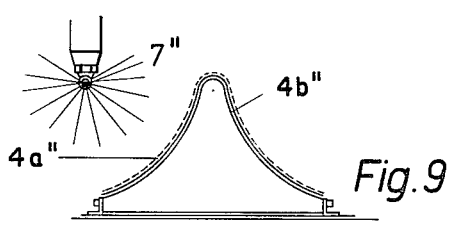

United States Patent Office 3,221,887
Patented Dec. 7, 1965

3,221,887
MACHINES FOR FILTERING LARGE QUANTITIES OF WATER AND OTHER LIQUIDS
Harald Joachim Georg Schade, Karlsruhe-Waldstadt, Germany, assignor to Passavant Werke, Nassau, Germany
Filed Aug. 14, 1961, Ser. No. 132,276
Claims priority, application Germany, Aug. 24, 1960, P 25,568
12 Claims. (Cl. 210—327)

This invention relates to machines for filtering large quantities of water and/or other liquids.

It is one object of this invention to provide improved machines of the aforementioned description.

It is another object of this invention to provide an improved liquid filtering machine including a plurality of individual substantially congruent, substantially cellular porous filter units which are mounted on a joint movable support as, for instance, a drum-type support, or an endless conveyor-type support.

The purpose of providing a liquid filtering machine with a larger number of individual substantially cellular porous filter units is to maximize the aggregate area of the active porous filter surface. In prior art filtering machines the geometry of the cellular porous filter units tends to increase the resistance to the flow of liquids and results also in the accumulation of comminuted solid matter at relatively inaccessible points of the filter units. These drawbacks, or limitations, tend to offset the advantages resulting from the provision of large areas of active filtering surfaces.

It is, therefore, another object of the invention to provide liquid filtering machines which are free from the aforementioned limitations or drawbacks.

The larger the height of cellular porous filter units, the larger the area of their active filtering surfaces and for this reason it appeared desirable to impart a substantial height to the cellular filter units of liquid filtering machines. All machines of the type under consideration must be provided with cleaning nozzle means to remove comminuted foreign matter accumulating, as time goes on, on their active porous filter surfaces. If the height of the cellular porous filter units is relatively large, the problem of achieving a satisfactory cleaning action by means of cleaning nozzle structures becomes exceedingly onerous. This is due to the fact that the impact of a jet of cleaning liquid upon a filter surface rapidly decreases with the distance of the surface from the orifice from which the jet of fluid emanates. If a given distance from such orifice is exceeded, jets of cleaning liquid are not sufficiently powerful any longer to effectively clean the porous surface of a cellular filter unit. This limitation made it necessary to provide, instead of relatively simple fixed or stationary cleaning nozzle structures, relatively complex movable nozzle structures adapted to be moved into cellular porous filter units in order to effectively clean the latter and to be moved out of cellular porous filter units after performance of their cleaning duty. The provision of movable cleaning nozzle structures adapted to minimize the distance between their orifice or orifices, and the porous filter surfaces to be cleaned, makes it possible to effectively clean cellular porous filter units though their height may be substantial. Cleaning nozzle structures adapted to be moved into, and out of, cellular porous filter units of liquid filtering machines are expensive to manufacture and subject to various mechanical defects.

It is, therefore, another object of this invention to provide filtering machines for large quantities of water and/or other liquids comprising a plurality of revolving cellular porous filter means whose height is substantial and whose active filtering area is correspondingly large and which are shaped and arranged in such a fashion that they lend themselves to be cleaned effectively by means of fixed or stationary cleaning nozzle structures.

The foregoing and other general and special objects of the invention and advantages thereof will more clearly appear from the ensuing particular description of the invention, as illustrated in the accompanying drawings, wherein:

FIG. 6 is a detail of FIG. 5 shown on a larger scale;

FIG. 7 is a section taken along 7—7 of FIG. 5 and showing two contiguous cellular filter units and their associated fixed nozzle structure; and FIGS. 8–10 are cross-sections of modified cellular porous filter units, FIGS. 8 and 9 including also a fixed nozzle structure associated with the respective filter unit.

Figure 1:
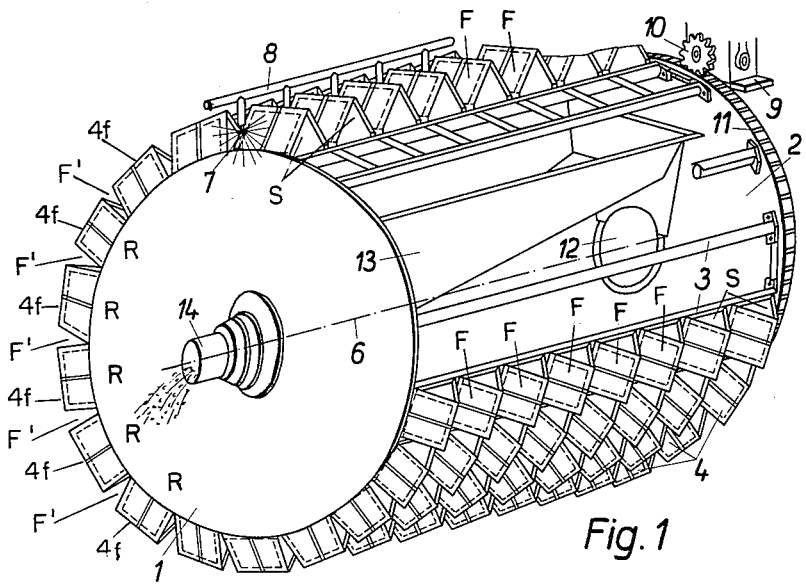
FIG. 1 is an isometric view of a drum-type filtering machine embodying the invention, some of the constituent parts of the structure of FIG. 1 being broken away to better expose the inside of the filtering drum.
Figure 2:
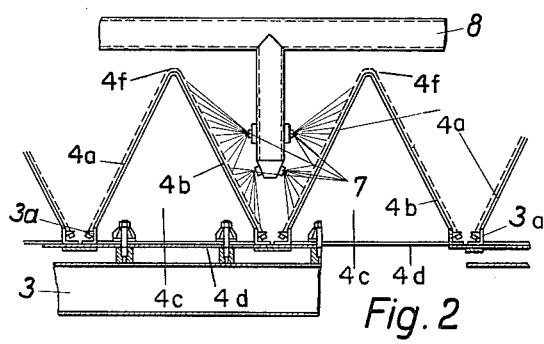
FIG. 2 is a section along a plane defined by the axis of the drum shown in FIG. 1 and by a generatrix thereof and shows a pair of contiguous substantially cellular porous filter units and a fixed cleaning nozzle structure associated with the same.
Figure 3:
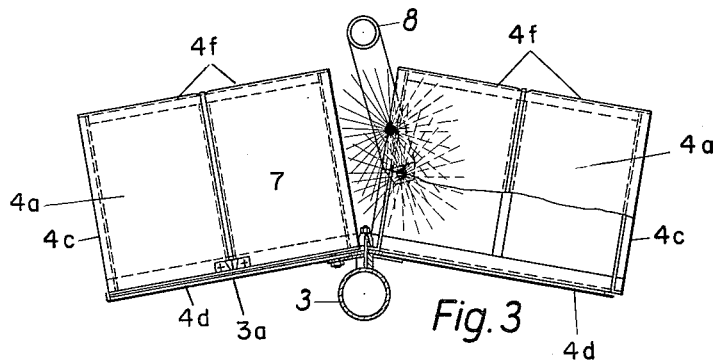
FIG. 3 is a side elevation seen in the direction of the axis of the drum of FIG. 1 of two contiguous cellular porous filter units.

Referring now to the drawings, and more particularly to FIGS. 1–3, the filtering machine comprises a rotatable, substantially drum-shaped frame structure including circular or disc-shaped end surfaces to which reference characters 1 and 2 have been applied. End surfaces or end plates 1 and 2 are interconnected by tie rods or tie tubes 3. Tie rods or tie tubes 3 are arranged in a cylindrical surface, or define a cylindrical surface, and each of tie rods or tie tubes 3 extends parallel to the axis 6 of the drum-shaped frame structure and is coextensive with a generatrix of the above referred-to cylindrical surface. Tie rods or tie tubes 3 support a plurality of individual, substantially cellular, preferably congruent filter units 4. Each of filter units 4 may be made up of a sub-frame structure 3a supporting porous filter surfaces. The latter may be formed by a suitable fabric, e.g. a filter cloth woven of synthetic fibers. In the embodiment of the invention shown in FIG. 1 filter units 4 are substantially in the shape of prisms substantially triangular in cross-section having one side arranged in the general plane defined by their supporting frame structure 1, 2, 3 or, to be more specific, in the cylindrical plane defined by tie rods or tie tubes 3. Each cellular filter unit has two sides 4a, 4b projecting radially outwardly from the cylindrical surface defined by tie rods or tie tubes 3. Sides 4a, 4b are formed by a porous filter material as, for instance, filter cloth made of synthetic fibers. The triangular end surfaces 4c of filter units 4 may either be open, or closed by a suitable material as, for instance, filter cloth. These two alternatives are optional. Filter units 4 are arranged on the frame structure 1, 2, 3 in a rectangular lattice pattern so as to define a first circular system of furrows, or recesses, F, extending in the sense of rotation of frame structure 1, 2, 3 and so as to define a second straight or linear system of furrows, or recesses, F', extending substantially at right angles to said first system of furrows or recesses F. In other words, the furrows or recesses F extend circularly around the periphery of structure 1, 2, 3, whereas the furrows or recesses F' extend axially, i.e. parallel to the axis of structure 1, 2, 3. Drum or frame structure 1, 2, 3 is adapted to rotate about its longitudinal axis 6 as will be explained below more in detail. Active filter surfaces 4a, 4b are inclined with respect to the axis 6 of rotation of structure 1, 2, 3. It will be apparent from FIGS. 1 and 2 that each filter unit 4 has a relatively wide rectangular cell-base-portion 4d which is open, i.e. not covered by filter cloth, or the like material. Cell-base-portions 4d are coextensive with an elemental portion of the cylindrical surface of drum or frame structure 1, 2, 3. Each cellular filter unit 4 further comprises a relatively narrow, substantially linear apex portion or upper edge portion 4f. Cell-apex-portions 4f are situated more remotely from the axis 6 of rotation of drum 1, 2, 3 than cell-base portions 4d. The composite filter structure shown in FIGS. 1 and 2 includes rows, groups, or systems R of filter units 4 aligned in a direction longitudinally of the axis of rotation 6 of drum 1, 2, 3. Each of the plurality of filter units supported on tie rods or tie tubes 3 of frame structure 1, 2, 3 is symmetrical relative to one of a plurality of planes extending at right angles to the axis 6 of rotation of drum 1, 2, 3, and the porous filter surfaces 4a, 4b are generally slanting with respect to the axis 6 of rotation of drum 1, 2, 3.

FIGS. 8–10 show possible modifications of the cellular filter units 4 shown in FIGS. 1 to 3. According to FIGS. 8–10 the filter units are more or less bell-shaped in cross-section. As shown in FIGS. 8 and 9 the lateral porous filter surfaces 4a', 4b' and 4a", 4b", respectively, are concave, and FIG. 10 shows a modification wherein the lateral porous filter surfaces 4a''', 4b''' of cellular filter units are convex.

The above referred-to sub-frame structures 3a may be made of wire and may be affixed to tie rods or tie tubes 3 by suitable fasteners as indicated in FIG. 2.

The individual filter units 4 form, in addition to the aforementioned parallel straight or linear groups or rows R of filter units parallel, circular rows or groups of filter units to which reference character S has been applied. Groups or rows R are separated by furrows or recesses F', and groups or rows S are separated by furrows F. A pipe 8 extends parallel to recesses or furrows F' and is arranged more remotely from axis 6 than the apex portions 4f of filter units 4. Pipe 8 is a distribution pipe for cleaning liquid for the active filter surfaces 4a, 4b. Normally clean water will be used for cleaning surfaces 4a, 4b. This is achieved by means of a plurality of nozzle structures 7 arranged between contiguous filter units 4 in circular rows S of filter units 4, or within the open spaces defined by the juxtaposed filter surfaces 4a, 4b of contiguous filter units 4 in axial rows R. In other words, the nozzle structures 7 are arranged inside of recesses or furrows F. The jets of atomized water or other filter-surface-cleaning liquid cover the entire area of filter surfaces 4a, 4b (see particularly FIG. 2). Nozzle structures 7 are arranged as close as possible to surfaces 4a, 4b so as to maximize the impact of liquid at the points where the atomized cleaning liquid hits upon the filter surfaces 4a, 4b to be cleaned by it. The distance between each nozzle orifice and all of the area of the filter surfaces to be cleaned by sprays emanating from the particular nozzle orifice should be equalized as much as possible. This can best be achieved by resorting to the concave filter unit designs shown in FIGS. 8 and 9 which have briefly been described above. FIGS. 8 and 9 show, in addition to the filter unit structures proper, the nozzle structures 7' and 7", respectively, used for cleaning the particular filter unit structures. It is apparent from FIGS. 8 and 9 that the orifices of the nozzles for cleaning the active filter surfaces 4a', 4b' and 4a", 4b", respectively, are arranged approximately in the center of curvature of these surfaces. In the structures of FIGS. 8 and 9 each droplet emanating from the orifices of one of the nozzles 7' and 7" has to travel an equal distance to reach an element of its juxtaposed filter surface, and therefore the impact of the cleaning fluid at each increment of the filter area to be cleaned is substantially equal.

In FIG. 1 reference character 9 has been applied to indicate a gear mechanism for driving filter drum 1, 2, 3 by means of a motor not shown in FIG. 1. Gear mechanism 9 includes a pinion 10 engaging the rim 11 of a gear wheel arranged on the rear side of drum 1, 2, 3. Rim 11 is affixed to the circular plate 2 and the latter is further provided with an axial duct-forming element 12 for admitting water and/or other liquids to be filtered into drum 1, 2, 3. Water or other liquids admitted through element 12 into drum 1, 2, 3 escape out of drum 1, 2, 3 substantially radially outwardly through filter surfaces 4a, 4b of filter units 4. Small solid particles or foreign comminuted matter are retained on the inner sides of the filter surfaces 4a, 4b from where it may subsequently be removed by the nozzle means 7. A trough 13 having a slanting bottom is fixedly arranged inside of drum 1, 2, 3. Trough 13 extends generally parallel to the axis 6 of rotation of drum 1, 2, 3 and has a rectangular entrance opening which is juxtaposed to the nozzles 7. Thus jets projecting from nozzles 7 through filter surfaces 4a, 4b enter into trough 13 carrying with them whatever solid matter has been filtered out and has been deposited on the inside of filter surfaces 4a, 4b. Trough 13 is provided with an outlet duct 14 arranged coaxially with respect to drum 1, 2, 3 and projecting from the inside of drum 1, 2, 3 through end surface 1 to the outside of drum 1, 2, 3. Foreign solid matter flushed from the inside of active filter surfaces 4a, 4b is removed from drum 1, 2, 3 by means of outlet duct 14.

Referring now to FIGS. 4–7, in the machine shown therein the surface of the drum of FIG. 1 has been replaced by an endless revolving conveyor which is substantially equivalent to the surface of the drum structure of FIG. 1. In other words, in the structure of FIGS. 4–7 an endless revolving conveyor is used as a frame structure for supporting a plurality of individual substantially cellular, preferably congruent filter units.

The conveyor used as filter-unit-supporting frame structure may be made up of two parallel chains 15 operated, i.e. moved, by a pair of chain wheels 16. The chain wheels 16 form an upper loop of chains 15. The lower loop thereof (not shown) might also be formed by chain wheels, but is preferably formed by substantially U-shaped chain-sliding or chain-guiding means arranged vertically below wheels 16. Juxtaposed chain links are tied together by tie frames 17 which correspond to the tie rods, or tie tubes 3, of the structure of FIG. 1. The tie frames 17 form supports for the individual, cellular, preferably congruent filter units 18 which may be identical to the filter units 4 described in connection with FIG. 1. Filter units 18 define endless furrows or recesses f extending in the direction of the motion of the conveyor or the endless chains 15, and they further define straight furrows or recesses f' extending at right angles to the direction of the motion of the conveyor or the endless chains 15. Distribution pipe 19 extends parallel to straight furrows or recesses f' and is provided with vertical nozzle extensions 20 of which each projects into one of endless furrows or recesses f. Distribution pipe 19 supplies clear water to nozzle extensions 20 which, in turn, produce jets of water penetrating through the porous filter surfaces of filter units 18 and flushing from the inside of these surfaces non-filterable particles which may have collected thereon. Trough 21 is arranged below distribution pipe 19 and juxtaposed to nozzle extensions 20 and is intended to receive the non-filterable comminuted matter being flushed from the inner surfaces of the filter units 18. The bottom 22 of trough 21 is slanted, and a delivery channel 23 is provided at the lowest point of trough 22.

Figure 4:
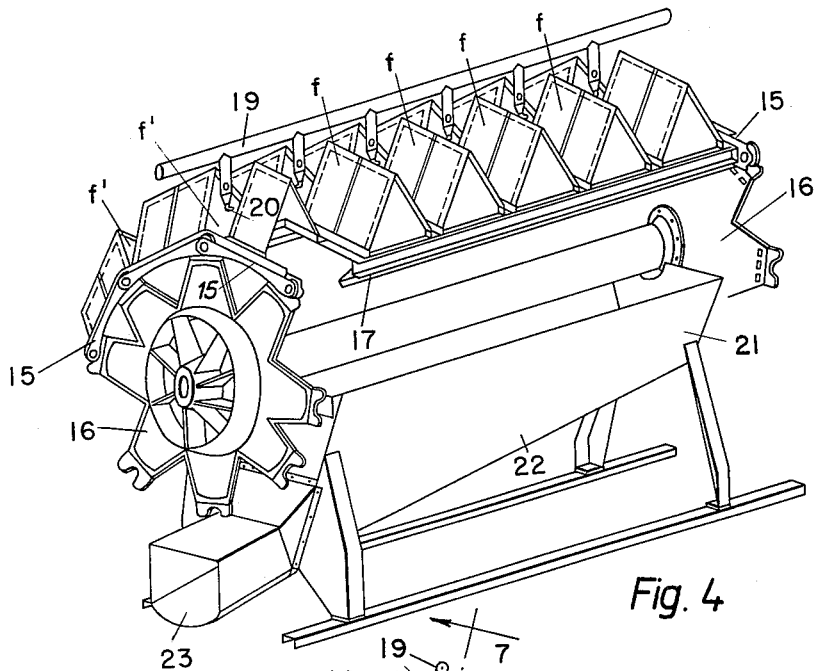
FIG. 4 is an isometric view of the upper portion of a conveyor type filtering machine embodying the present invention.
Figure 5:
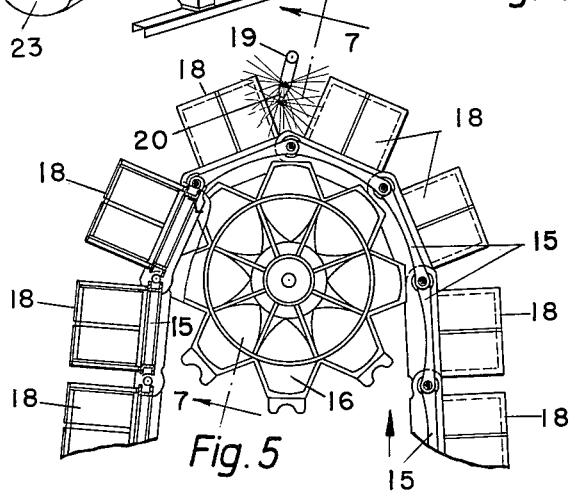
FIG. 5 is a side elevation of the structure shown in FIG. 4.

Since FIGS. 4 and 5 show but the upper portion of a conveyor type filtering machine the duct means for admitting the liquid to be filtered to the machine and the means for draining the clear filtrate from the machine do not appear in FIGS. 4 and 5. In other words, these means are arranged at a lower level than that illustrated in FIGS. 4 and 5. The liquid to be filtered may be admitted to, and the clear filtrate may be drained from, the structure of FIGS. 4 and 5 in substantially the same way as shown in FIG. 1 and described in connection with FIG. 1. To be more specific, the liquid to be filtered is admitted to the concave sides of filter cells and drained from the convex sides thereof. The liquid to be filtered is supplied to the space bounded by the lower portion of the conveyor loop and may leave that space by flowing out of it in vertical direction or more or less horizontal directions. Solid matter is thus collected inside of the cell cavities, carried upward inside of the cell cavities, and is flushed out of the latter when they reach their highest position in their up and down travel. In that position the filter cells are juxaposed to the washing structure 7, 8 and flushed out.

While I have described what at present are considered to be preferred embodiments of the invention, it will be understood that the invention is not limited to the specific structures which have been disclosed. It will be understood that various changes and modifications can be made without departing from the spirit and scope of the invention as defined in the following claims.

I claim as my invention:

1. A machine for filtering large quantities of water and other liquids comprising a substantially drum shaped frame structure defining a substantially cylindrical base surface; rotatable means supporting said drum-shaped frame structure, said rotatable means having a predetermined axis of rotation; a plurality of filter systems supported by and jointly rotatable with said drum-shaped frame structure, each of said plurality of filter systems comprising a plurality of substantially cellular filter units aligned in a direction longitudinally of said drum shaped frame structure; each of said plurality of filter units having a relatively narrow apex portion and a relatively wide base portion substantially coextensive with a portion of said cylindrical base surface, and each of said plurality of filter units having lateral porous filter surfaces converging from said base portion toward said apex portion thereof; tubular means coaxial with said axis of rotation for admitting liquid to be filtered into the inside of said drum-shaped frame structure to establish a radially outward flow of said liquid through said plurality of filter units; and a plurality of spaced fixed spray nozzle structures for atomizing liquids arranged in the open spaces defined between contiguous filter units within one of said plurality of filter systems, each of said plurality of spray nozzle structures having orifices arranged closer to said axis of rotation than said apex portion of each of said plurality of filter units and said orifices being adapted to eject jets of liquid in opposite directions to cover with the sprays ejected therefrom juxtaposed filter surfaces of contiguous filter units within one of said plurality of filter systems.

2. A machine for filtering large quantities of water and other liquids comprising a frame structure; rotatable means having an axis of rotation and supporting said frame structure; a plurality of filter systems supported by and jointly rotatable with said frame structure, each of said plurality of filter systems comprising a plurality of individual substantially cellular filter units aligned in a direction longitudinally of said axis; each of said plurality of filter units having a substantially linear apex portion crossing at substantially right angles with said predetermined axis and a base portion coextensive with an elemental area of said frame structure, and each of said plurality of filter units having a pair of lateral porous filter surfaces converging from said base portion toward said apex portion thereof; means for admitting liquid to be filtered to the base-portion-side of said filter units; means allowing the filtrate to be drained off the apex-portion-side of said filter units; and a plurality of spaced fixed spray nozzle structures for atomizing liquids projecting into the open spaces defined between contiguous filter units within one of said plurality of filter systems, each of said plurality of spray nozzle structures defining orifices arranged closer to said frame structure than said apex portion of each of said plurality of filter units, and said orifices being oriented in the direction of said axis and arranged in pairs to cover with the sprays ejected therefrom juxtaposed filter surfaces of contiguous filter units within one of said plurality of filter systems.

3. A machine for filtering large quantities of water and other liquids comprising a plurality of individual substantially congruent substantially cellular porous filter units each having a relatively wide base portion and each tapering toward a substantially linear apex portion; a frame structure for supporting said plurality of filter units on said base portion thereof with said apex portion protruding from said frame structure; rotatable means having a predetermined axis of rotation supporting said frame structure and adapting said frame structure to be moved in a predetermined direction; said plurality of filter units being arranged on said frame structure to form a plurality of parallel rows each extending transversely to the direction of movement of the portion of said frame structure supporting the particular row; means for admitting a liquid to be filtered to the side of said plurality of filter units adjacent said base portion thereof; means for draining filtered liquid from the side of said plurality of filter units adjacent said apex portion thereof; and means for removing solid comminuted matter having collected on said filter units, said removing means including a plurality of spaced fixed spray nozzle means projecting into the empty spaces formed between contiguous filter units in said plurality of rows of filter units, said spray nozzle means defining orifices arranged closer to said frame structure than said apex portion of each filter unit within rows of filter units.

4. A machine for filtering large quantities of water and other liquids comprising a drum having an outer substantially cylindrical surface and having a central axis; rotatable means providing a rotatable support for said drum; a plurality of substantially cellular substantially congruent porous filter units supported adjacent said outer cylindrical surface of said drum to jointly revolve with said drum, each of said plurality of filter units having a base portion coextensive with a portion of said outer cylindrical surface of said drum and a relatively narrow elongated apex-portion arranged more remotely from said axis of said drum than said base portion and oriented substantially in the direction of rotation of said drum, said plurality of filter units being arranged on said drum in groups each extending in the direction of a generatrix of said outer cylindrical surface, contiguous filter units of each of said groups forming recesses between apex-portions thereof and said recesses being aligned to form a plurality of endless furrow-shaped spaces extending around said surface of said drum; means arranged along the axis of said drum for admitting liquids to be filtered to the inside of said drum; a supply pipe for cleaning liquid; a plurality of fixed filter cleaning nozzles supplied with cleaning liquid from said pipe and projecting into said recesses formed between said contiguous filter units and having orifices situated inside of said recesses.

5. A machine for filtering large quantities of water and other liquids comprising a filter-unit-supporting frame structure; rotatable means having a predetermined axis of rotation adapting said frame structure to revolve in a predetermined sense; a plurality of substantially cellular filter units supported by said frame structure and jointly movable with said frame structure, each of said plurality of filter units having a substantially linear apex portion arranged in a plane at right angles to said axis of rotation relatively remote from said frame structure and a substantially rectangular base portion coextensive with a portion of said frame structure, said base portion including two sides parallel to said apex portion and having substantially the same length as said apex portion, and each of said plurality of filter units having lateral porous filter surfaces converging in the direction from said base portion to said apex portion, said plurality of filter units being arranged on said frame structure in a rectangular lattice pattern and defining a first system of furrows each extending in the sense of movement of said frame structure and further defining a second system of furrows extending substantially at right angles to said first system of furrows; means for supplying liquids to be filtered to the base-portion-side of said plurality of filter units; means for draining filtered liquids from the apex-portion-side of said plurality of filter units; and additional means for establishing flows of liquid in the direction from the apex-portion-side of said plurality of filter units to the base-portion-side thereof, said additional means including a plurality of nozzle structures for spraying a cleaning liquid upon said filter surfaces, said plurality of nozzle structures projecting into the open spaces defined by said first system of furrows and having ends having a smaller spacing from said frame structure than said apex portion of each of said plurality of filter units.

6. A machine for filtering large quantities of water and other liquids comprising a plurality of substantially cellular filter units; a movable frame structure for supporting said plurality of filter units and for causing joint movement thereof; rotatable means for operating said frame structure having an axis of rotation; each of said plurality of filter units including porous filter surfaces extending in a direction radially outwardly from said axis of rotation and being inclined with respect to said axis of rotation, each of said filter surfaces including points closest to said frame structure and points most remote from said frame structure; means for admitting liquid to be filtered to the sides of said cellular units adjacent said axis of rotation; means for draining the filtrate arranged at the sides of said cellular units remote from said axis of rotation; and spray nozzle means having orifices closer to said frame structure than said points of said filter surfaces most remote from said frame structure.

7. A machine as specified in claim 6 wherein each of said plurality of filter units includes a pair of porous surfaces defining a relatively wide cell-base-portion situated relatively close to said axis of rotation and further defining a relatively narrow cell-apex-portion situated relatively remote from said axis of rotation, and wherein said spray nozzle means define a plurality of orifices closer to said axis of rotation than said cell apex-portion.

8. A machine for filtering large quantities of water and other liquids comprising a frame structure; a rotatable support for said frame structure having a predetermined axis of rotation and rotatably supporting said frame structure; a plurality of filter systems supported by and jointly rotatable with said frame structure, each of said plurality of filter systems comprising a plurality of individual substantially cellular filter units aligned in a direction longitudinally of said axis of rotation, each being symmetrical relative to a plane at right angles to said axis of rotation, and each including a pair of porous filter surfaces generally slanting with respect to said axis of rotation, said plurality of filter units defining a plurality of endless furrow-shaped spaces extending around said axis of rotation; tubular means coaxial to said axis of rotation for admitting liquid to be filtered to the sides of said filter surfaces adjacent said axis of rotation; a distribution pipe for liquids arranged parallel to said axis of rotation and more remote from said axis of rotation than said cellular filter units; and a plurality of perforated nozzles integral with said pipe, each of said plurality of nozzles projecting with the end thereof remote from said pipe into one of said plurality of endless furrow-shaped spaces.

9. A machine for filtering large quantities of water or other liquids comprising a frame structure; a rotatable support for said frame structure having a predetermined axis of rotation rotatably supporting said frame structure; a plurality of filter systems supported by and jointly rotatable with said frame structure, each of said plurality of filter systems including a plurality of individual substantially cellular filter units aligned in a direction longitudinally of said axis of rotation, each being symmetrical relative to one of a plurality of planes at right angles to said axis of rotation and each including a pair of porous filter surfaces generally slanting with respect to said axis of rotation, said plurality of filter units defining a plurality of endless furrow-shaped spaces extending around said axis of rotation; means for establishing a flow of liquid to be filtered from a space relatively close to said axis of rotation radially outwardly to a space relatively remote from said axis of rotation; and a plurality of fixed spray nozzles for liquids projecting into said furrow-shaped spaces and having orifices at opposite sides thereof adapted to cover with the sprays ejected therefrom juxtaposed filter surfaces of filter units contiguously arranged within said plurality of filter systems.

10. A machine for filtering large quantities of water and other liquids comprising a frame structure; means including an axis of rotation for rotating said frame structure in a predetermined sense; a plurality of substantially cellular porous filter units supported by said frame structure to jointly revolve with said frame structure, each of said plurality of filter units having a relatively wide base portion coextensive with a portion of said frame structure and a relatively narrow elongated apex portion oriented in said predetermined sense, said plurality of filter units being arranged on said frame structure in straight groups each extending transversely to said predetermined sense, contiguous filter units forming furrow-shaped recesses between said apex portions thereof extending in the direction of said predetermined sense; duct means for supplying liquids to be filtered to the base-portion-side of said plurality of filter units; means for draining filtered liquids from the apex-portion-side of said plurality of filter units to establish flows of liquid to be filtered transversely across said plurality of filter units in the direction from said base-portion-side to said apex-portion-side thereof; and additional means for establishing flows of liquid transversely across said plurality of filter units in the direction from said apex-portion-side to said base-portion-side thereof, said additional means including a plurality of stationary cleaning nozzles projecting into said furrow-shaped recesses formed between said contiguous filter units and each having orifices situated inside said recesses.

11. A machine for filtering large quantities of water comprising a substantially drum-shaped frame structure defining a substantially cylindrical base surface; rotatable means supporting said drum-shaped frame structure, said rotatable means having a predetermined axis of rotation; a plurality of filter systems supported by and jointly rotatable with said drum-shaped frame structure, each of said plurality of filter systems comprising a plurality of substantially cellular filter units aligned in a direction longitudinally of said drum-shaped frame structure; each of said plurality of filter units having a relatively narrow apex portion and a relatively wide base portion substantially coextensive with a portion of said cylindrical base surface, and each of said plurality of filter units having concave lateral porous filter surfaces converging from said base portion toward said apex portion thereof and having a predetermined center of curvature, said lateral porous filter surfaces of said plurality of filter units defining a plurality of annular furrow-shaped spaces extending around said axis of rotation; tubular means coaxial with said axis of rotation for admitting liquid to be filtered into the inside of said drum-shaped structure to establish a substantially radially outward flow of said liquid through said plurality of filter units; and a plurality of spaced fixed spray nozzle structures for atomizing liquids, each of said plurality of nozzle structures being juxtaposed to one of said plurality of furrow-shaped spaces and arranged substantially at said predetermined center of curvature of said concave lateral porous filter surfaces of said plurality of filter units, each of said plurality of spray nozzle structures having orifices adapted to eject jets of liquids in opposite directions to cover with the sprays ejected therefrom juxtaposed filter surfaces of filter units situated at opposite sides of said furrow-shaped spaces.

12. A machine for filtering large quantities of water and other liquids comprising a filter-unit-supporting frame structure having a filter-unit-supporting surface; rotatable supporting means for said frame structure adapting said frame structure to revolve in a predetermined sense; a plurality of filter units supported by and jointly movable with said frame structure, each of said plurality of filter units being substantially in the shape of a prism substantially triangular in cross-section and substantially rectangular in side elevation and having one side arranged in said filter-unit-supporting surface and having two sides projecting out of said filter-unit-supporting surface and defining an edge at the intersection thereof, said two sides being formed by a porous filter material, said plurality of filter units being arranged on said frame structure in a rectangular lattice pattern and defining a first system of furrows each extending in the sense of revolution of said frame structure and further defining a second system of furrows each extending substantially at right angles to the constituent furrows of said first system of furrows; means for supplying liquids to be filtered to said one side of each of said plurality of filter units; means for draining filtered liquids from said two sides of each of said plurality of filter units; and additional means for establishing flows of liquid from said two sides of each of said plurality of filter units to said one side of each of said plurality of filter units, said additional means including a plurality of nozzle structures for spraying cleaning liquid upon said two sides of each of said plurality of filter units, and said plurality of nozzle structures projecting into open spaces formed by the constituent furrows of said first system of furrows and said plurality of nozzle structures having a smaller spacing from said filter-unit-supporting surface than said edge formed at said intersection of said two sides of each of said plurality of filter units.

References Cited by the Examiner
UNITED STATES PATENTS

| | | | |
|---|---|---|---|
| 1,510,568 | 10/1924 | Sweetland | 210—327 |
| 1,629,572 | 5/1927 | Geiger | 210—400 X |
| 1,630,274 | 5/1927 | North | 210—403 |
| 2,022,069 | 11/1935 | Whitmore | 210—327 X |
| 2,322,415 | 6/1943 | Buckbee | 210—330 |

REUBEN FRIEDMAN, *Primary Examiner.*

HERBERT L. MARTIN, CHARLES SUKALO,
*Examiners.*